United States Patent
Ogata et al.

(10) Patent No.: US 10,528,401 B1
(45) Date of Patent: Jan. 7, 2020

(54) OPTIMIZING ACCESSES TO READ-MOSTLY VOLATILE VARIABLES

(71) Applicant: INTERNATIONAL BUSINESS MACHINES CORPORATION, Armonk, NY (US)

(72) Inventors: Kazunori Ogata, Tokyo (JP); Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/038,557

(22) Filed: Jul. 18, 2018

(51) Int. Cl.
| | |
|---|---|
| *G06F 9/52* | (2006.01) |
| *G06F 8/30* | (2018.01) |
| *G06F 9/455* | (2018.01) |
| *G06F 8/41* | (2018.01) |
| *G06F 9/38* | (2018.01) |

(52) U.S. Cl.
CPC .............. *G06F 9/526* (2013.01); *G06F 8/30* (2013.01); *G06F 8/443* (2013.01); *G06F 9/3851* (2013.01); *G06F 9/45533* (2013.01); *G06F 9/522* (2013.01)

(58) Field of Classification Search
CPC .......... G06F 8/30; G06F 8/443; G06F 9/3851; G06F 9/45533
See application file for complete search history.

(56) References Cited

U.S. PATENT DOCUMENTS

| | | | | |
|---|---|---|---|---|
| 6,671,707 B1 * | 12/2003 | Hudson | ............... | G06F 12/0269 |
| 7,818,306 B2 | 10/2010 | McKenney et al. | | |
| 9,880,931 B2 * | 1/2018 | Seaton | ............... | G06F 12/0269 |
| 2008/0082532 A1 | 4/2008 | McKenney | | |
| 2011/0063313 A1 * | 3/2011 | Bolz | ..................... | G06T 15/005 |
| | | | | 345/531 |
| 2015/0227624 A1 * | 8/2015 | Busch | ............... | G06F 16/90339 |
| | | | | 707/728 |
| 2017/0109182 A1 * | 4/2017 | Seaton | ............... | G06F 12/0269 |

OTHER PUBLICATIONS

Anderson et al., "Chihuahua: A Concurrent, Moving, Garbage Collector using Transactional Memory" (Year: 2015).*
Hudson et al., "Sapphire: Copying GC Without Stopping the World" (Year: 2002).*
W. Puffitsch, "Data Caching, Garbage Collection, and the Java Memory Model" (Year: 2009).*

(Continued)

*Primary Examiner* — Phillip H Nguyen
(74) *Attorney, Agent, or Firm* — Tutunjian & Bitetto, P.C.; Vazken Alexanian (57) ABSTRACT

A computer-implemented method, computer program product, and computer processing system are provided for eliminating a memory fence for reading a read-mostly volatile variable of a computer system. The read-mostly variable is read from more than written to. The method includes writing data to the read-mostly volatile variable only during a Stop-The-World (STW) state of the computer system. The method further includes executing the memory fence in any mutator threads and thereafter exiting the STW state. The method also includes reading the read-mostly volatile variable by the mutator threads without executing the memory fence after the STW state.

20 Claims, 5 Drawing Sheets

(56) References Cited

OTHER PUBLICATIONS

Ugawa et al., "Transactional Sapphire: Lessons in High-Performance, On-the-fly Garbage Collection" (Year: 2018).*
Chen et al., "Fast Consensus Using Bounded Staleness for Scalable Read-Mostly Synchronization", IEEE Transactions on Parallel and Distributed Systems, Dec. 2016, pp. 3485-3500, vol. 27, No. 12.
Liu et al., "Scalable Read-mostly Synchronization Using Passive Reader-Writer Locks", 2014 USENIX Annual Technical Conference, Jun. 2014, 13 pages.

* cited by examiner

```
Class C {
    volatile int v;   # volatile variable void setV(int x) {
        v = x;   # write volatile v
    } int getV() {
        return v;   # read volatile v
    }
}
```

FIG. 4

```
Class C {
    @ReadMostlyVolatile    # Tell JVM v is read-mostly volatile
    volatile int v;        # read-mostly volatile variable void setV(int x) {
        v = x;     # write read-mostly volatile v
        #  JIT compiler generates code to call an API to ask GC to
        #    set v during STW
        #  Interpreter does the same operation in the bytecode
        #    handler of putfield
    } int getV() {
        return v;   # read v as if it is non-volatile
    }
}
```

OPTIMIZING ACCESSES TO READ-MOSTLY VOLATILE VARIABLES

BACKGROUND

Technical Field

The present invention generally relates to memory devices, and more particularly to optimizing accesses to read-mostly volatile variables.

Description of the Related Art

A memory barrier, also known as a memory fence, is a type of barrier instruction that causes a processor or compiler to enforce an ordering constraint on memory operations issued before and after the barrier instruction. Essentially this means that operations issued prior to the memory barrier are guaranteed to be performed before operations issued after the barrier.

In the Java® memory model, accesses to volatile variables are used as a kind of memory barrier that controls the visibility of data in memory. For example, if a thread-A writes data to a volatile variable v and another thread-B reads the latest value of the volatile variable (=1), a Java® semantic guarantees that thread-B reads the latest values of all data written to memory by thread-A before it writes the data to the volatile variable v.

The preceding semantic causes a large overhead on a POWER platform because reading volatile variables requires a memory fence. However, some volatile variables are rarely modified after they are initialized, and thus, memory fences are not needed in such cases. For example, java.lang.System.security holds a reference to the current security manager, and almost no program changes the security manager during execution. However, there is an Application Programming Interface (API) to change it, so the variable needs to be volatile. Since the API to get the current security manager (System.getSecurityManager( )) is frequently called, computer performance is detrimentally affected by the overhead of the memory fence.

That is, in sum, some Java® volatile variables are rarely updated and mostly read from. However, accessing such variables still need a memory barrier because they are volatile, even though their values are almost runtime constants. Hence, there is a need for a way to safely remove memory barriers.

SUMMARY

According to an aspect of the present invention, a computer-implemented method is provided for eliminating a memory fence for reading a read-mostly volatile variable of a computer system. The read-mostly variable is read from more than written to. The method includes writing data to the read-mostly volatile variable only during a Stop-The-World (STW) state of the computer system. The method further includes executing the memory fence in any mutator threads and thereafter exiting the STW state. The method also includes reading the read-mostly volatile variable by the mutator threads without executing the memory fence after the STW state.

According to another aspect of the present invention, a computer program product is provided for eliminating a memory fence for reading a read-mostly volatile variable of a computer system. The read-mostly variable is read from more than written to. The computer program product includes a non-transitory computer readable storage medium having program instructions embodied therewith. The program instructions are executable by a computer to cause the computer to perform a method. The method includes writing data to the read-mostly volatile variable only during a Stop-The-World (STW) state of the computer system. The method further includes executing the memory fence in any mutator threads and thereafter exiting the STW state. The method also includes reading the read-mostly volatile variable by the mutator threads without executing the memory fence after the STW state.

According to yet another aspect of the present invention, a computer processing system is provided for eliminating a memory fence for reading a read-mostly volatile variable of the computer processing system. The read-mostly variable is read from more than written to. The computer processing system includes a virtual machine, having a memory operatively coupled to a processing element, and being configured to write data to the read-mostly volatile variable only during a Stop-The-World (STW) state of the computer system. The virtual machine is further configured to execute the memory fence in any mutator threads and thereafter exiting the STW state. The virtual machine is also configured to read the read-mostly volatile variable by the mutator threads without executing the memory fence after the STW state.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to optimizing accesses to read-mostly volatile variables. As used herein, the term "read-mostly volatile variables" refers to volatile variables that are read from more than they are written to (reads from>writes to), hence the descriptor "read-mostly".

In an embodiment, the present invention eliminates memory fences for reading read-mostly volatile variables by only modifying them during a Stop-The-World (STW) period of a stop-the-world garbage collector. A STW garbage collector completely halts execution of a computer program to run a collection cycle, thus guaranteeing that new objects are not allocated, and objects do not suddenly become unreachable while the STW garbage collector is running. An advantage of STW Garbage Collection (GC) is that it is both simpler to implement and faster than incremental garbage collection.

Hence, in an embodiment, the present invention lets STW GC update the read-mostly volatile variables, so that a reader of the variables can access them without a memory barrier. In an embodiment, an Application Programming Interface (API) is added in the GC, and a new annotation is added for the JT compiler to limit instruction reordering so as not to move instructions across GC safe points.

Figure 1:
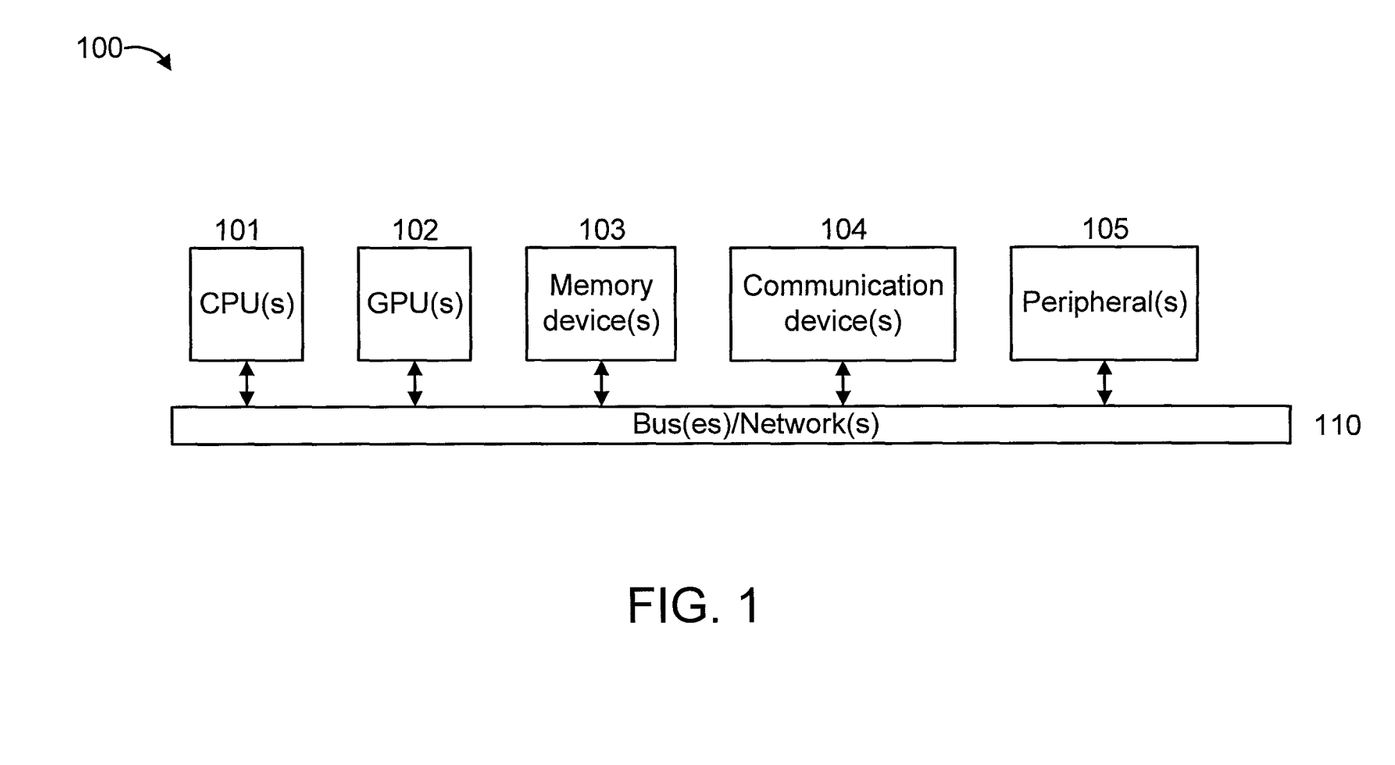
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). RAMs and ROMs can be considered as non-cache memories for the purposes of the present invention. The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110). Elements of processing system 100 such as the memory devices 103 and/or processing elements (101 and/or 102) can form one or more Virtual Machines (VMs) for implementing various aspect of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
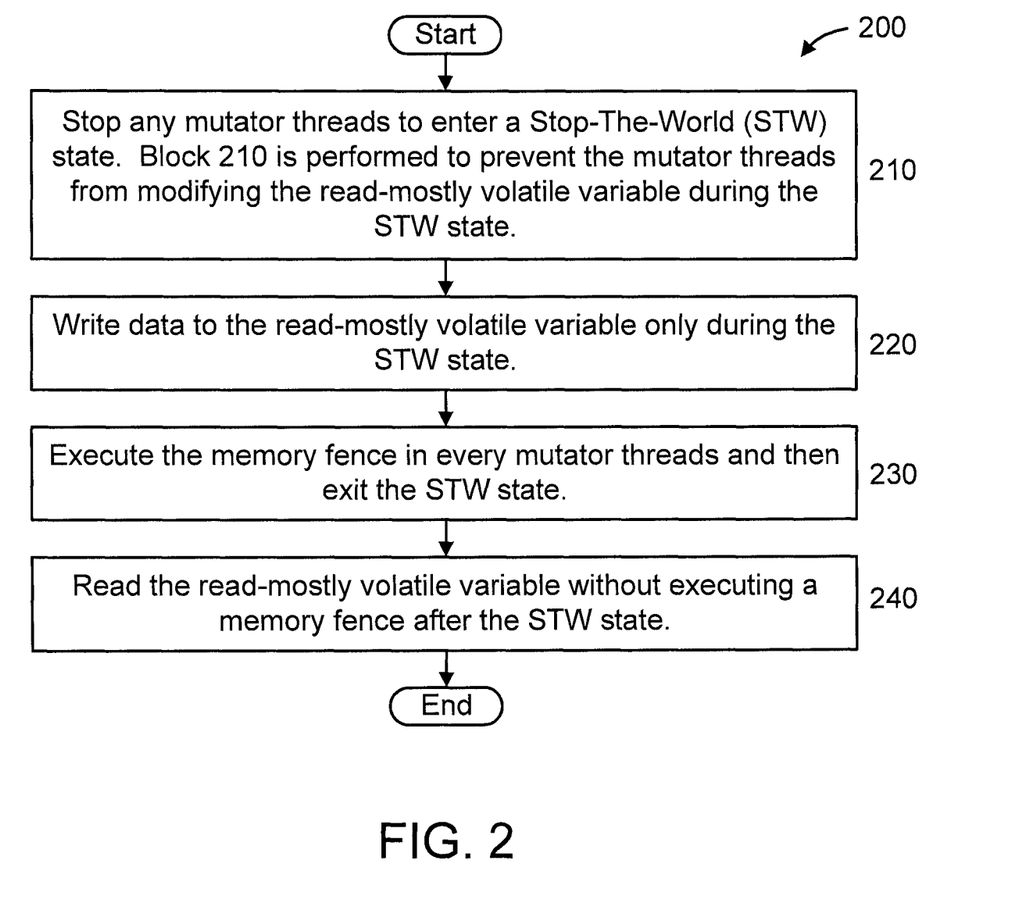
FIG. 2 is a flow diagram showing an exemplary method for optimizing accesses to a read-mostly volatile variable of a computer system, in accordance with an embodiment of the present invention.

FIG. 2 is a flow diagram showing an exemplary method 200 for optimizing accesses to a read-mostly volatile variable of a computer system, in accordance with an embodiment of the present invention. Method 200 optimizes the accesses to the read-mostly volatile variable by eliminating a memory fence for reading the read-mostly volatile variable. As noted above, a read-mostly volatile variable is a volatile variable that is read from more than it is written to.

At block 210, stop any mutator threads to enter a Stop-The-World (STW) state of the computer system. Block 210 is performed to prevent the mutator threads from modifying the read-mostly volatile variable during the STW state.

At block 220, write data to the read-mostly volatile variable only during the STW state.

At block 230, execute the memory fence in every mutator threads and then exit the STW state.

At block 240, read the read-mostly volatile variable without executing a memory fence after the STW state.

It is to be appreciated that the present invention is not limited to any particular method for identifying read-mostly volatile variables. Hence, it is to be further appreciated that existing techniques including, but not limited to the following, can be used to identify read-mostly volatile variables: profiling; explicitly adding annotations by programmers; and so forth.

In an embodiment, the present invention can be efficiently implemented by adding an API into the GC to modify the read-mostly volatile variable during the STW state because the GC already has a mechanism to request the STW state and to execute a memory fence when each thread resumes execution after completion of the STW state.

In an embodiment, a Java® Virtual Machine (JVM®) is modified to hold information to identify which fields are read-mostly volatile, so that the interpreter and the JIT compiler of the JVM® can use the information.

The interpreter and the JIT compiler change the operation for accessing read-mostly volatile variables as follows:
(1) The bytecode handlers of putfield and getfield check if a field is read-mostly volatile. If so, then the putfield handler calls the added API, and the getfield handler reads the field without a memory fence.
(2) The JIT compiler generates the code to call the API when a read-mostly volatile variable is modified.

Some optimizations of the JIT compiler need to be disabled to ensure that the generated code reads the latest value of a read-mostly volatile variable from memory. These optimizations can include the following:
(1) Never cache the value of read-mostly volatile variable but always read it from memory.
(2) For reordering load instructions that appear after a load from the read-mostly volatile variable in program order, the compiler restricts the load instructions from being moved before a nearest GC safe point. That is, the compiler may move the load instruction just after nearest GC safe point, a few instructions after the nearest GC safe point, or leave it at the original location.

Figure 3:
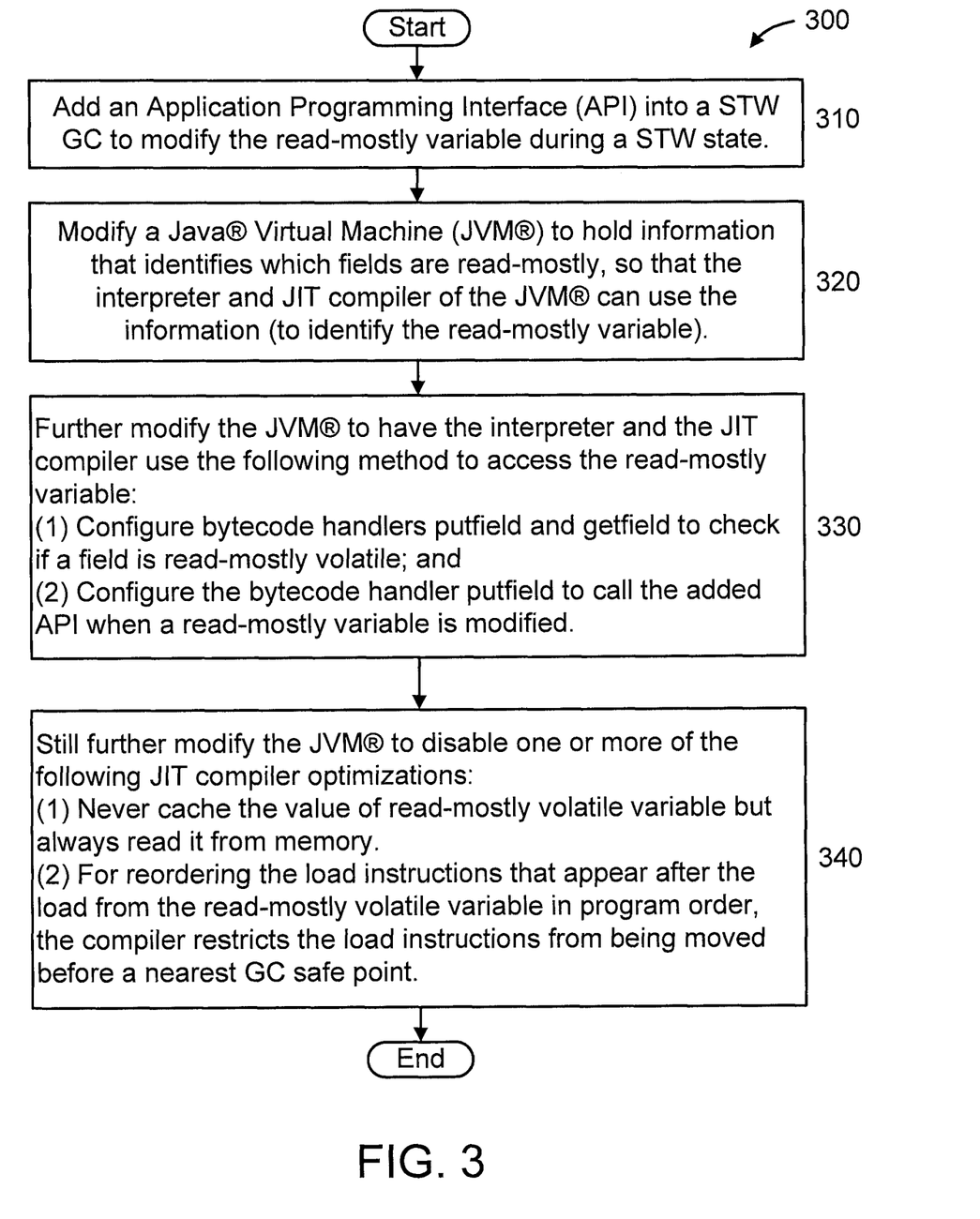
FIG. 3 is a flow diagram showing an exemplary method for enabling optimization of accesses to a read-mostly volatile memory, in accordance with an embodiment of the present invention.

FIG. 3 is a flow diagram showing an exemplary method 300 for enabling optimization of accesses to a read-mostly volatile memory, in accordance with an embodiment of the present invention.

At block 310, add an Application Programming Interface (API) into a STW GC to modify the read-mostly variable during a STW state.

At block 320, modify a Java® Virtual Machine (JVM®) to hold information that identifies which fields are read-mostly, so that the interpreter and JIT compiler of the JVM® can use the information (to identify the read-mostly variable).

At block 330, further modify the JVM® to have the interpreter and the JIT compiler use the following method to access the read-mostly variable:
(1) Configure bytecode handlers putfield and getfield to check if a field is read-mostly volatile; and
(2) Configure the bytecode handler putfield to call the added API when a read-mostly variable is modified.

At block 340, still further modify the JVM® to disable one or more of the following JIT compiler optimizations:

(1) Never cache the value of read-mostly volatile variable but always read it from memory.

(2) For reordering the load instructions that appear after the load from the read-mostly volatile variable in program order, the compiler restricts the load instructions from being moved before a nearest GC safe point. That is, the compiler may move the load instruction just after nearest GC safe point, a few instructions after the nearest GC safe point, or leave it at the original location.

Figure 4:
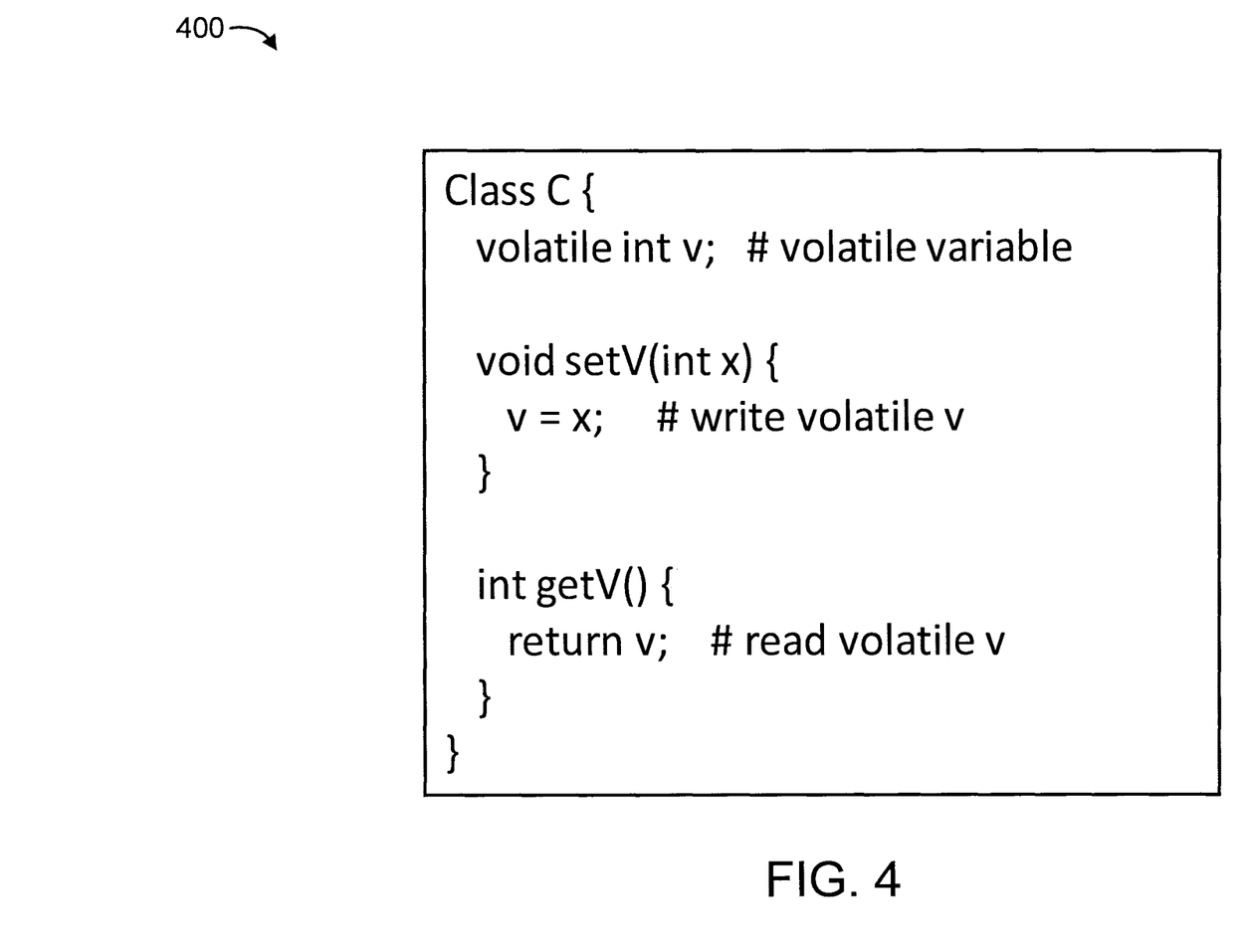
FIG. 4 is a diagram showing an exemplary original Java® program to which the present invention can be applied, in accordance with an embodiment of the present invention.

FIG. 4 is a diagram showing an exemplary original Java® program 400 to which the present invention can be applied, in accordance with an embodiment of the present invention.

Figure 5:
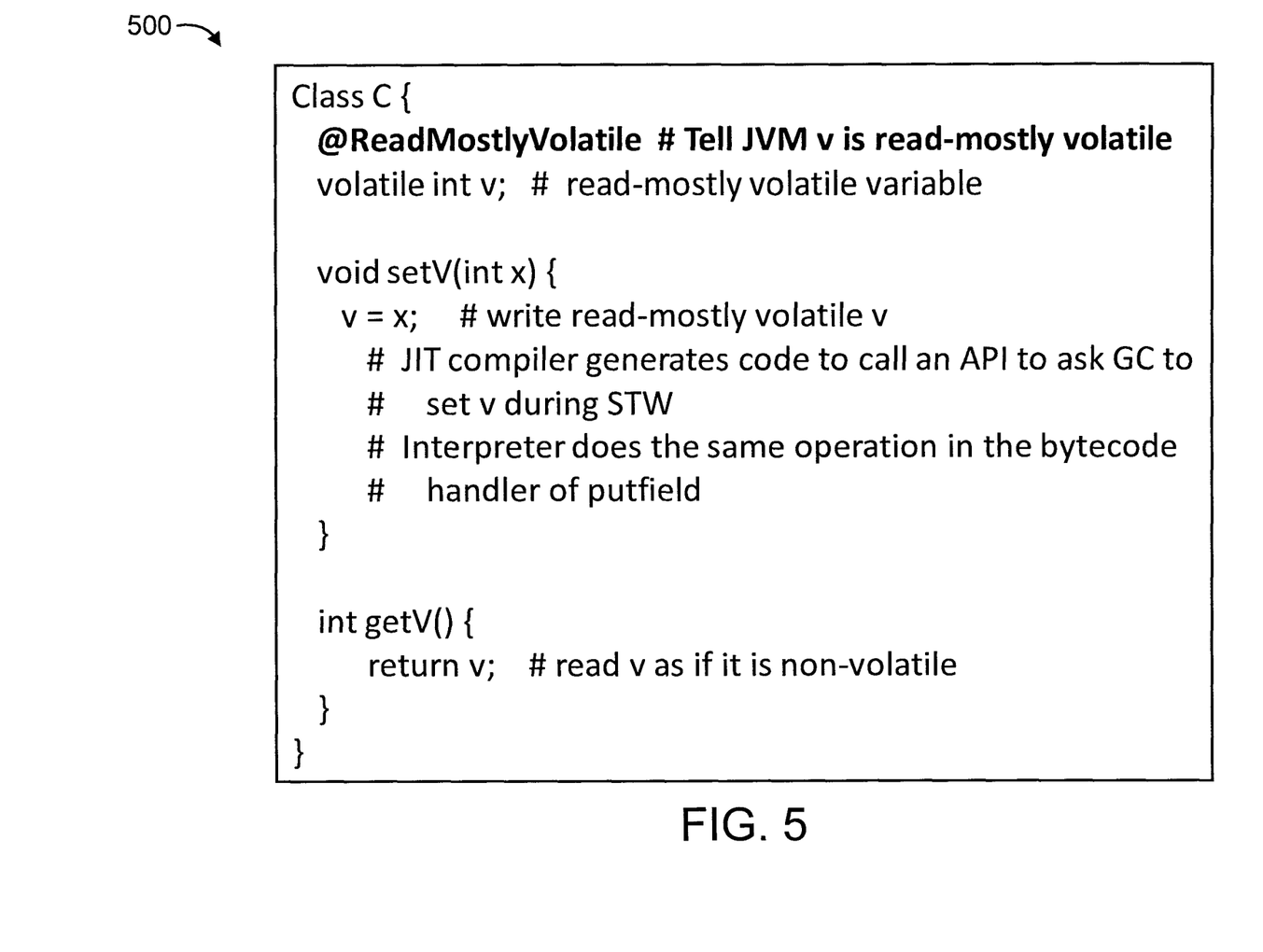
FIG. 5 is a diagram showing an exemplary Java® program modified by application of the present invention, in accordance with an embodiment of the present invention.

FIG. 5 is a diagram showing an exemplary Java® program 500 modified by application of the present invention, in accordance with an embodiment of the present invention. In particular, Java® program 500 is a version of Java® program 400 modified by an application of an embodiment of the present invention thereto.

As can be seen in Java program 500, relative to Java program 400, Java program 500 now includes code directed to writing to the read-mostly volatile variable only during a STW state. In this way, the previous detrimental semantics of the Java memory model are overcome thereby reducing the significant overhead typically required to read volatile variables using a memory fence as per the prior art. This and other advantages of the present invention are readily determined by one of ordinary skill in the art, given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for eliminating a memory fence for reading a read-mostly volatile variable of a computer system, the read-mostly variable being read from more than being written to, the method comprising:

writing data to the read-mostly volatile variable only during a Stop-The-World (STW) state of the computer system;

executing the memory fence in any mutator threads and thereafter exiting the STW state; and reading the read-mostly volatile variable by the mutator threads without executing the memory fence after the STW state.

2. The computer-implemented method of claim 1, further comprising stopping the mutator threads before entering the STW state to prevent the mutator threads from modifying the read-mostly volatile variable during the STW state.

3. The computer-implemented method of claim 1, further comprising adding an Application Programming Interface (API) into a STW garbage collector to write the data to the read-mostly volatile variable only during the STW state.

4. The computer-implemented method of claim 3, further comprising:

configuring a first bytecode handler and a second bytecode handler to determine whether a field is read-mostly volatile; and configuring the first bytecode handler to call the API and the second bytecode handler to read the field without the memory fence, responsive to the field being determined as read-mostly volatile.

5. The computer-implemented method of claim 1, further comprising configuring a compiler of a Virtual Machine (VM) to generate code to call the API when the read-mostly variable is modified.

6. The computer-implemented method of claim 1, further comprising disabling a compiler optimization that prohibits caching a value of the read-mostly variable and mandates reading the value from non-cache memory.

7. The computer-implemented method of claim 1, further comprising disabling a compiler optimization that, for reordering load instructions that appear after a load from the read-mostly volatile variable in program order, restricts the load instructions from being moved before a nearest GC safe point.

8. The computer-implemented method of claim 1, further comprising modifying a Virtual Machine (VM) to hold information to identify which fields are read-mostly volatile.

9. The computer-implemented method of claim 8, wherein the information is accessed by an interpreter and a compiler of the VM.

10. A computer program product for eliminating a memory fence for reading a read-mostly volatile variable of a computer system, the read-mostly variable being read from more than being written to, the computer program product comprising a non-transitory computer readable storage medium having program instructions embodied therewith, the program instructions executable by a computer to cause the computer to perform a method comprising:

writing data to the read-mostly volatile variable only during a Stop-The-World (STW) state of the computer system;

executing the memory fence in any mutator threads and thereafter exiting the STW state; and reading the read-mostly volatile variable by the mutator threads without executing the memory fence after the STW state.

11. The computer program product of claim 10, wherein the method further comprises stopping the mutator threads before entering the STW state to prevent the mutator threads from modifying the read-mostly volatile variable during the STW state.

12. The computer program product of claim 10, wherein the method further comprises adding an Application Programming Interface (API) into a STW garbage collector to write the data to the read-mostly volatile variable only during the STW state.

13. The computer program product of claim 12, wherein the method further comprises:
configuring a first bytecode handler and a second bytecode handler to determine whether a field is read-mostly volatile; and
configuring the first bytecode handler to call the API and the second bytecode handler to read the field without the memory fence, responsive to the field being determined as read-mostly volatile.

14. The computer program product of claim 10, wherein the method further comprises configuring a compiler of a Virtual Machine (VM) to generate code to call the API when the read-mostly variable is modified.

15. The computer program product of claim 10, wherein the method further comprises disabling a compiler optimization that prohibits caching a value of the read-mostly variable and mandates reading the value from non-cache memory.

16. The computer program product of claim 10, wherein the method further comprises disabling a compiler optimization that, for reordering load instructions that appear after a load from the read-mostly volatile variable in program order, restricts the load instructions from being moved before a nearest GC safe point.

17. The computer program product of claim 10, wherein the method further comprises modifying a Virtual Machine (VM) to hold information to identify which fields are read-mostly volatile.

18. The computer program product of claim 17, wherein the information is accessed by an interpreter and a compiler of the VM.

19. A computer processing system for eliminating a memory fence for reading a read-mostly volatile variable of the computer processing system, the read-mostly variable being read from more than being written to, the computer processing system comprising:
a virtual machine, having a memory operatively coupled to a processing element, and being configured to
write data to the read-mostly volatile variable only during a Stop-The-World (STW) state of the computer system;
execute the memory fence in any mutator threads and thereafter exiting the STW state; and
read the read-mostly volatile variable by the mutator threads without executing the memory fence after the STW state.

20. The computer processing system of claim 19, wherein the virtual machine stops the mutator threads before entering the STW state to prevent the mutator threads from modifying the read-mostly volatile variable during the STW state.

* * * * *